United States Patent [19]

Gotoh

[11] 4,428,547
[45] Jan. 31, 1984

[54] MAGNETIC RECORDING TAPE CARTRIDGE

[75] Inventor: Shinichi Gotoh, Kyoto, Japan

[73] Assignee: Hitachi Maxell, Limited, Osaka, Japan

[21] Appl. No.: 357,082

[22] Filed: Mar. 11, 1982

[30] Foreign Application Priority Data

Mar. 11, 1981 [JP] Japan ............................ 56-32704[U]
Jan. 16, 1982 [JP] Japan ............................ 57-4255[U]

[51] Int. Cl.³ .................. G03B 1/04; G11B 15/32
[52] U.S. Cl. ................................................ 242/199
[58] Field of Search .................. 242/197–200, 242/71.2; 360/93, 96.2–96.4, 132; 352/72, 78 R

[56] References Cited

U.S. PATENT DOCUMENTS

| 2,676,766 | 4/1954 | Ross et al. ............... 242/199 X |
| 2,951,654 | 9/1960 | Steelman ................... 242/198 |
| 4,195,797 | 4/1980 | Okamura .................... 242/199 |

*Primary Examiner*—Leonard D. Christian
*Attorney, Agent, or Firm*—Birch, Stewart, Kolasch & Birch

[57] ABSTRACT

A magnetic recording tape cartridge comprising a top section and a bottom section assembled together to define a chamber therebetween for containing a pair of tape reels each of which is resiliently supported by a spring plate member, the base portion of which is fixed onto the top section, wherein the improvement comprises a partition wall means for separating at least the base portion of the spring plate member from the chamber.

6 Claims, 9 Drawing Figures

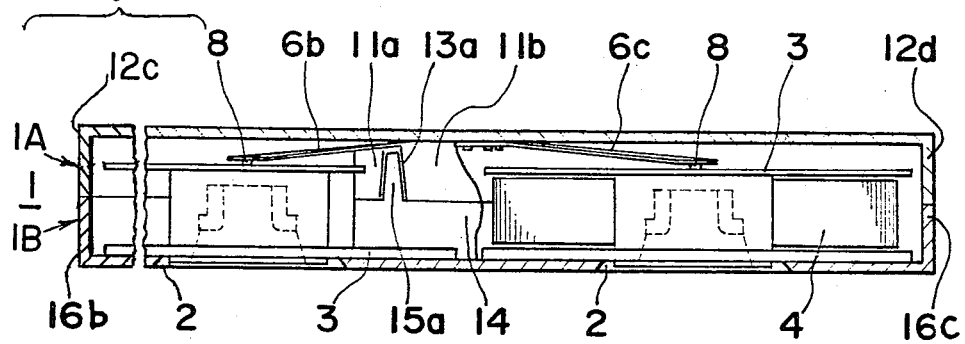
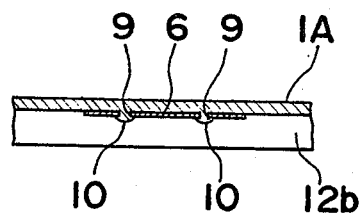
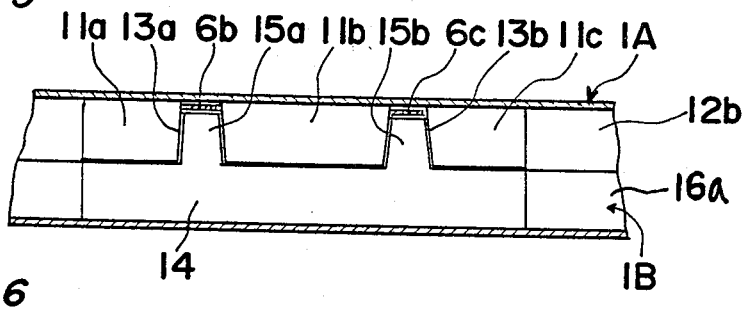
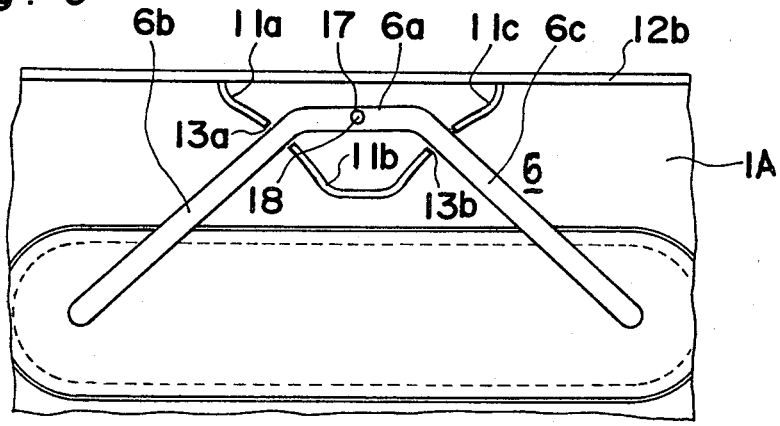

MAGNETIC RECORDING TAPE CARTRIDGE

FIELD OF THE INVENTION

The present invention relates to a magnetic recording tape cartridge having a pair of tape reels and a resilient plate member with its free end portions engaged with the axis of each of the tape reels for pressing the tape reels so as to prevent undesired movement of the tape reels.

BACKGROUND OF THE INVENTION

It is well known that in a video tape cartridge, there is provided a spring plate of stainless steel fixed to a top plate of the top section of the cartridge with each of the free ends of the spring plate extending to above the corresponding top end of the axis of the tape reel to suppress undesired vertical displacement of the tape reels.

U.S. Pat. No. 3,934,839 discloses one example of a magnetic recording tape cartridge having such a spring plate as mentioned above. In this magnetic recording tape cartridge, the spring plate is fixed onto the inside surface of a top section of a magnetic recording tape cartridge without any partition wall member surrounding the center portion of the spring plate. The spring plate is fixed onto the top section in such a manner that one or more perforations defined in the center portion of the spring plate are inserted in corresponding projections formed on the inside surface of the top section. In turn, the projections are caulked by a thermal deformation using a suitable die with ultrasonic welding. However, when the projection is caulked, some part of the projection expands from the gap between the die and the surface of the spring plate to form a thin plate-like portion. Such a thin plate-like portion tends to be separated from the projection as one or more pieces of fragments due to undesirable force caused by a vibration of the cartridge while the magnetic recording tape cartridge is used. If the separated fragment is undesirably fitted with a magnetic recording tape, drop out of the recorded signals and/or noise may occur when the magnetic recording tape is reproduced.

Another disadvantage being inherent in the prior art magnetic recording tape cartridge is that in assembling the spring plate onto the top section, since relative position between the perforations of the spring plate and the projections formed on the top section is not easily adjusted, it takes time to engage the perforations of the spring plate with the corresponding projections on the top section.

SUMMARY OF THE INVENTION

An essential object of the present invention is to provide a magnetic recording tape cartridge capable of preventing a magnetic recording tape from being contaminated with undesired fragmental pieces so as to reproduce information without drop out of signals and/or noise.

Another object of the present invention is to provide a magnetic recording tape cartridge in which a spring plate member for pressing tape reels can be easily fixed in position.

A further object of the present invention is to provide a magnetic recording tape cartridge in which a part of the top section of the cartridge where a spring plate for pressing tape reels is fixed is reinforced by one or more wall members so as to prevent undesired vibration of the top section.

According to a preferred embodiment of the present invention, there is provided a magnetic recording tape cartridge comprising a top section and a bottom section, each of the sections having a front wall, a rear wall and side walls. The sections being assembled together to define a tape chamber therebetween for containing a pair of tape reels each of which is rotatably supported with a bottom axis thereof engaged with the bottom section and a top axis thereof engaged with a spring plate member, the spring plate member having a base portion fixed onto the top section and a pair of leg portions extending from the base portion to each of the top axis of the tape reels, wherein the improvement comprises a partition wall means for separating at least the base portion of the spring plate member from the tape chamber.

BRIEF DESCRIPTION OF THE DRAWINGS

FIG. 3 is a cross sectional view of a magnetic recording tape cartridge according to the present invention;

FIG. 4 is a partial cross sectional view taken along the line A—A in FIG. 1 showing a way of fixing a spring plate employed in the magnetic recording tape cartridge shown in FIG. 1;

FIG. 5 is a partial front view showing an essential portion of a magnetic recording tape cartridge according to the present invention;

FIG. 6 is a partial inside plan view showing another embodiment of the magnetic recording tape cartridge according to the present invention;

DESCRIPTION OF THE PREFERRED EMBODIMENTS

Figure 1:
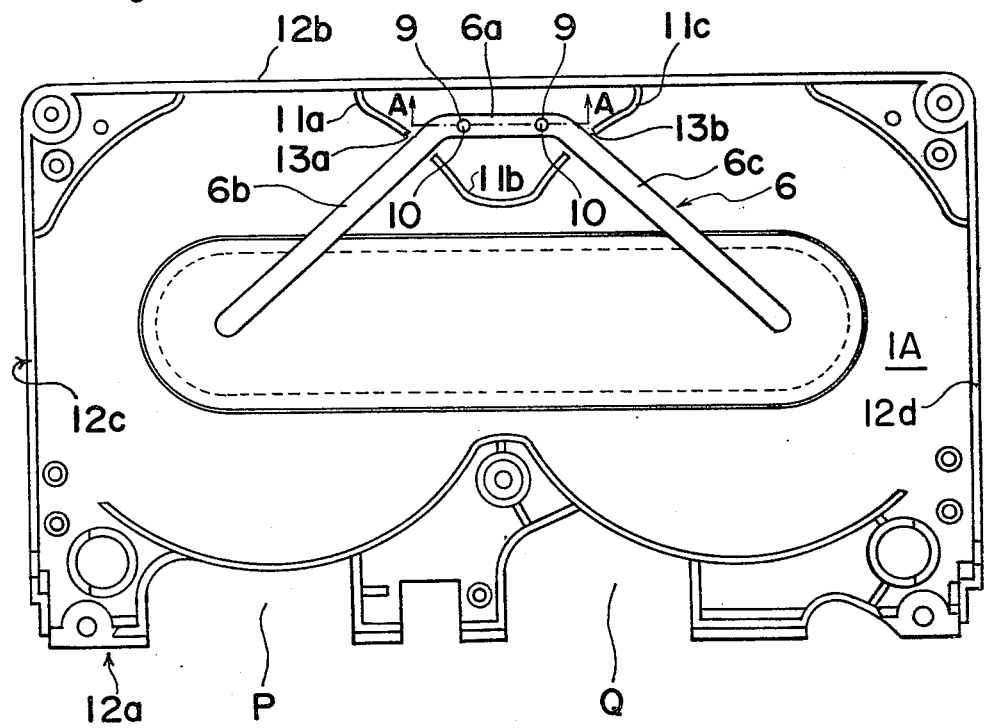
FIG. 1 is an inside plan view of a preferred embodiment of a top section of a magnetic recording tape cartridge according to the present invention.
Figure 2:
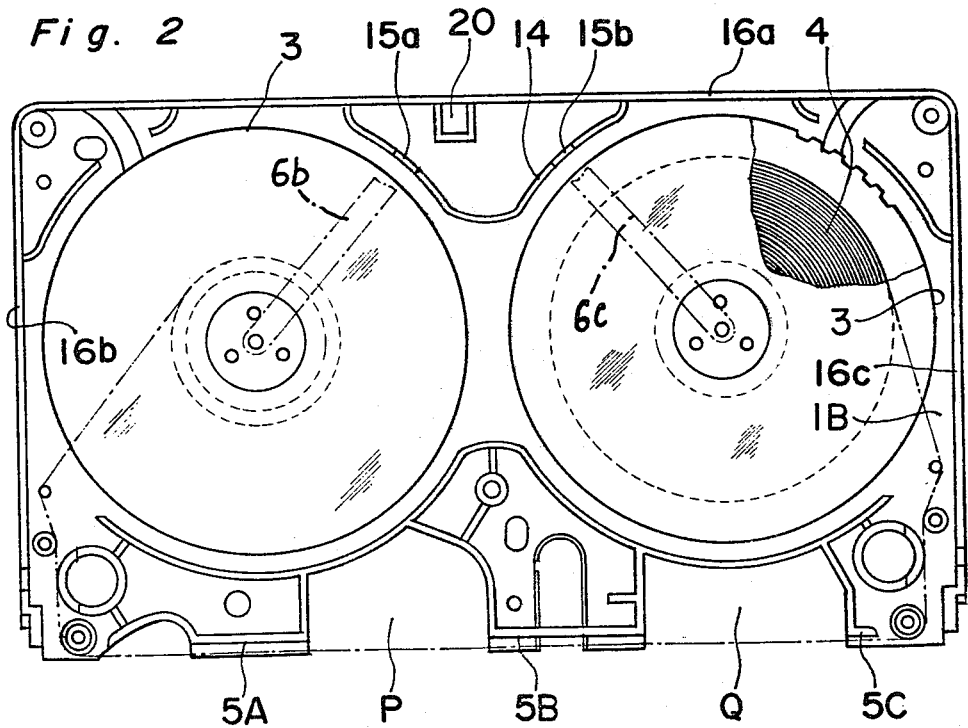
FIG. 2 is an inside plan view of a bottom section which is assembled with the top section shown in FIG. 1.

Referring now to FIGS. 1 to 3, there is shown a magnetic recording tape cartridge, so called video tape cassette, according to an embodiment of the present invention comprising a case generally designated 1 composed of a top section 1A, a bottom section 1B, each portion being made of a plastic material, such as an ABS resin. Both sections 1A and 1B are combined together to provide a tape chamber in a known manner.

As shown in FIG. 3, the bottom section 1B is provided at a generally central location with a pair of through-holes 2 at predetermined positions for receiving the drive shafts of a recording/reproducing apparatus or a video tape player. A pair of tape reels 3 for winding a magnetic tape 4 are rotatably mounted in the respective holes 2. The tape 4 can be retracted from one of the tape reels 3 and taken up on the other after travelling along the front face of the cartridge case 1.

This front face is separated into three front walls 5A, 5B and 5C, and between each pair of adjacent front walls 5A and 5B and 5B and 5C, there are a pair of clearances P and Q which function as openings for receiving pins of a video tape player for moving the tape out of the cartridge case 1. That is, as seen from FIGS. 1 and 2, the bottom plate of the cartridge case is cut away to define spaces for insertion of the tape draw out pins when the cartridge is mounted in the player. A lid (not shown) may be rotatably mounted on the front side of the top section 1A.

As shown in FIG. 1, a spring plate 6 made of a stainless steel material having a generally V character configuration is provided on the inside surface of the top section 1A with the base portion 6a fixed at the rear portion of the top portion 1A by a caulking method as hereinafter explained. Each of the leg portions 6b and 6c extends slantingly to the top end of the axis of each of the tape reels 3 so that the free ends 7 of the spring plate 6 engage with the top ends of the axis 8 of the tape reels 3 resiliently from above to suppress undesired displacement of the tape reels 3 when the tape cartridge is not in use.

The spring plate 6 is fixed to the top section 1A in such a manner that, as shown in FIG. 4, a pair of perforations 9 defined in the base portion 6a of the spring plate 6 are fitted with the corresponding projections 10 formed inside the top section 1A and in turn each of the top end portions of the projections 10 is caulked from above by a thermal melting method using ultrasonic welding.

As shown in FIG. 1, there are formed three partition walls 11a, 11b and 11c on the inside face of the top section 1A surrounding said base portion 6a of the spring plate 6. Said partition walls 11a, 11b and 11c have a height generally equal to that of the front wall 12a, rear wall 12b and side walls 12c and 12d. Between the respective partition walls 11a, 11b and 11c, two gaps 13a and 13b with such a width as slightly wider than the width of the leg portions 6b or 6c of the spring plate 6 are formed so that the leg portions 6b or 6c can be passed through the gaps 13a or 13b with a close facing between the side edge of the leg and partition wall but without any friction therebetween, thereby preventing undesired separation of small pieces of resin material from the partition walls. Both ends of the partition walls 11a and 11b are respectively connected with the rear wall 12b.

The front view of the gaps 13a and 13b and the projected walls 15a and 15b may be slightly and complimentary tapered as shown in FIG. 4.

On the other hand, there is also provided a lower partition wall 14 having the same height as that of the rear wall 16a and, side walls 16b and 16c of the bottom section 1B on the inside face of the bottom section 1B with a similar configuration in plan view of a general plan view of the partition walls 11a, 11b and 11c on the top section 1A so as to form a closed chamber surrounding the base portion 6a of the spring plate 6 when the top section 1A is assembled with the bottom section 1B in a correct manner. On the lower partition wall 14, a pair of projected walls 15a and 15b are formed at the positions corresponding to the respective gaps 13a and 13b in the top section 1A with a width just mating with the gaps 13a or 13b and with such a height as the top edges of the projected walls 15a and 15b face correspondingly under the surface of the leg portions 6b and 6c but leave a small clearance when the top sections 1A and 1B are assembled together.

Both ends of the lower partition wall 14 are connected with the rear wall 16a through 16d of the bottom section 1B.

By the provision of the partition walls 11a, 11b and 11c with the gaps 13a and 13b, in the process of mounting the spring plate 6 on the top section 1A, the spring plate 6 is guided by the gaps 13a and 13b so that the perforations 9 of the spring plate 6 and the projections 10 can easily be adjusted and engaged together. After mounting of the spring plate 6 in position, the top portion of the respective projections 10 are caulked by a heat melting method, so that the spring plate 6 is fixed on the top section 1A.

Further, when the top section 1A and the bottom section 1B are assembled together in a correct manner, the lower edge of the partition walls 11a, 11b and 11c and the upper edge of the lower partition wall 14 are abutted together with the projected walls 15a and 15b mated within the gaps 13a and 13b so that the base portion of the spring plate 6 is enclosed in the chamber surrounded by the partition walls 11a through 11c and 14. Therefore, even if one or more fragmented pieces of plastic resin, which are formed during caulking of the projections 10 were separated from the projections, the fragmented pieces will be enclosed in the chamber, thus, the magnetic recording tape 4 is not harmed by such fragmented pieces of resin, thereby resulting in reproduction of picture information without drop out of signals and/or noise.

In the assembled state, the tape reels 3 are positioned as shown in FIG. 1 with the top ends of the axis of the tape reels 3 resiliently supported by the free ends of the legs 6b and 6c of the spring plate 6 passing through the openings defined by the partition walls 11a through 11c and the projected walls 15a and 15b.

Further, in a case where an erase preventing member 20 is provided on the bottom section 1B within the space surrounded by the partition 14, as shown in FIG. 2, and the erase preventing member 20 is folded and separated from he bottom section 1B, the erase preventing member 20 is also enclosed within the chamber. Also, when dust or the like enters the chamber from the opening defined by the separation of the erase preventing member 20, dust is also enclosed in the chamber so that the magnetic recording tape is not stained.

It is noted that there are defined clearances between the top end of the projected wall 15a or 15b and the lower face of the spring plate 6 so that the spring plate 6 can move slightly in a vertical direction to assure resilient supporting of the tape reels 3.

Referring to FIG. 6, the spring plate 6 is fixed onto the top section 1A by only one perforation 17 defined in the base portion of the spring plate 6 engaged with a corresponding single projection 18 formed on the top section 1A.

Figure 7:
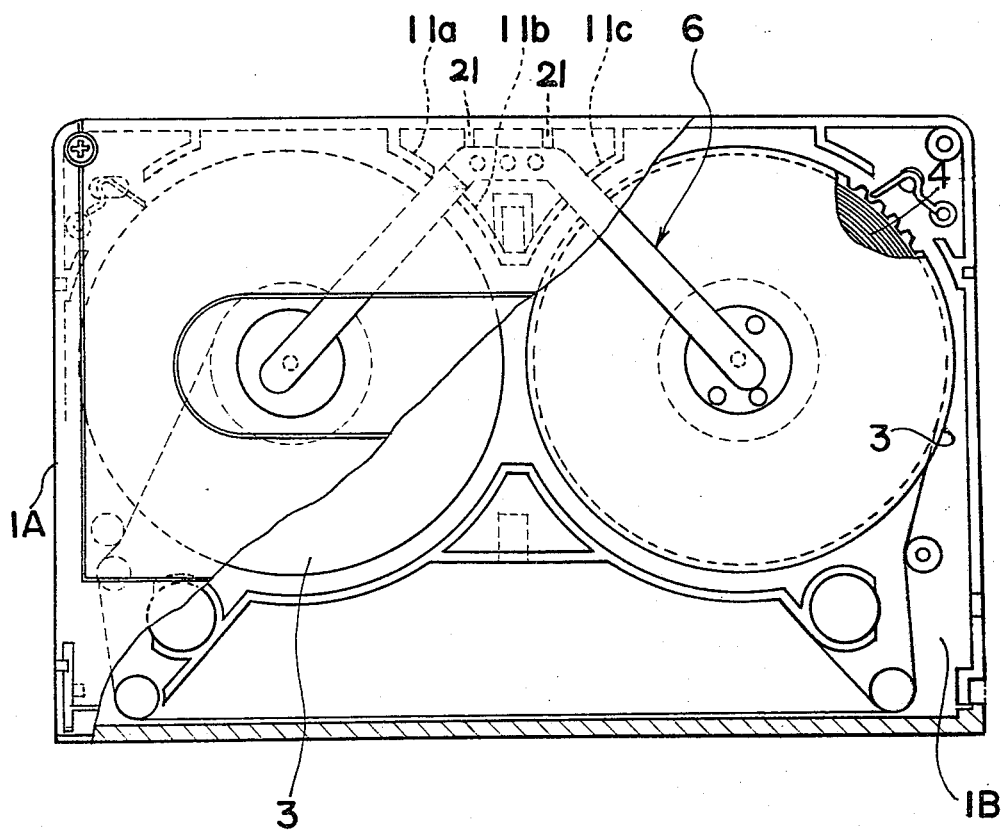
FIG. 7 is a plan view showing a further embodiment of a magnetic recording tape cartridge according to the present invention with a part of the top section broken.
Figure 8:
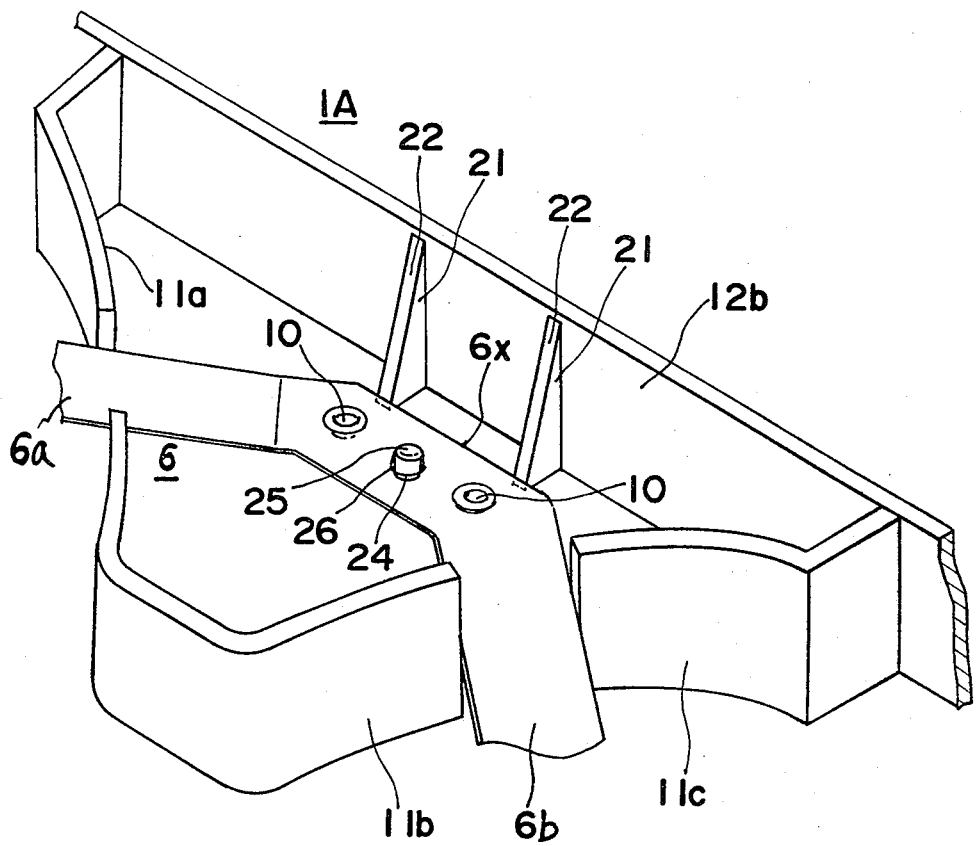
FIG. 8 is a partial perspective view showing an essential portion of a magnetic recording tape cartridge shown in FIG. 7.

FIGS. 7 and 8 show another embodiment of the present invention in which a pair of guide walls 21 are formed inside the face of the rear wall 12b of the top section 1A with slanting faces 22. By this construction, when assembling the spring plate 6 on the top section 1A, by adjusting the rear edge 6x with the lowermost end of the guide walls 21, the perforations 9 of the base portion 6a can easily be adjusted with the projections 10.

In this embodiment, an additional perforation 24 on the spring plate 6 and the additional projection 25 on the top section are formed to facilitate adjustment between the perforation 9 and the projections 10. It is noted that there is formed some clearance or play 26 between the projection 25 and the additional perforation 24.

Figure 9:
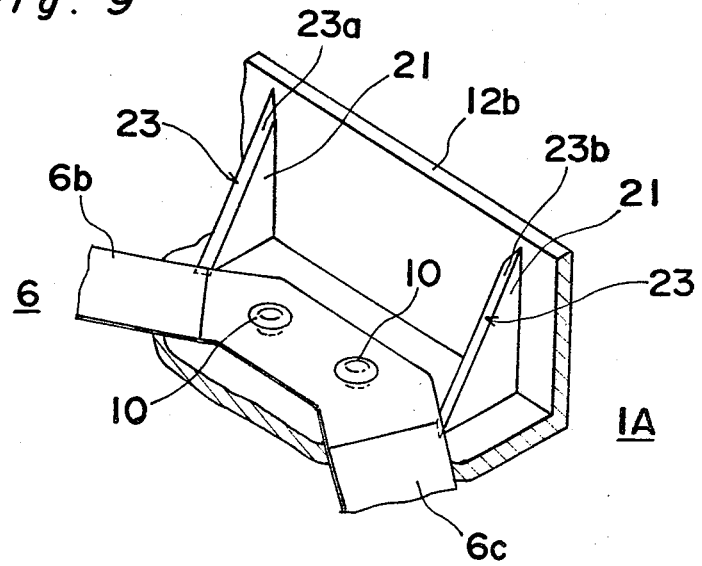
FIG. 9 is a partial exploded view showing a modification of an embodiment shown in FIG. 7.

FIG. 9 is a modification of the embodiment shown in FIG. 8 in which the slanting faces 23 of the guide walls 21 are further inclined on the inside faces 23a and, 23b of the guide walls 21 with such an angle fitting with the slope of the leg portions 6b and 6c of the spring plate 6. In this embodiment, the perforations of the spring plate 6 can more easily be adjusted with the projections 10.

It is noted that by provision of partition wall members and/or guide wall members are described above, a part of the top section near the base portion of the spring plate member wherein said spring plate member is fixed is reinforced mechanically so that undesired vibration of the part of the top section can be suppressed to prevent separation of small pieces of resin material formed by caulking of the projections when fixing the spring plate.

Although the present invention is explained with reference to a video tape cassette, the present invention can also be applied to various types of magnetic recording tape cartridges and the configurations of the partition walls are not limited to the embodiments as hereinbefore described but any suitable configuration can be employed so long as the base portion of the spring plate is enclosed in the partition walls.

What is claimed is:

1. A magnetic recording tape cartridge comprising a top section and a bottom section, each of the sections having a front wall, a rear wall and side walls, said sections being assembled together to define a tape chamber therebetween for containing a pair of tape reels each of which is rotatably supported with a bottom axis thereof engaged with said bottom section and a top axis thereof engaged with a spring plate member, said spring plate member having a base portion fixed onto said top section and a pair of leg portions extending from said base portion to each of the top axis of said tape reels,
   wherein the improvement comprising a partition wall means for separating at least said base portion of said spring plate member from said tape chamber.

2. A magnetic recording tape cartridge according to claim 1 wherein said partition wall means comprises upper wall members formed inside the top section with gaps defined at the position where said leg portion of the spring plate passes, and a lower wall member formed inside said top section having a configuration in plan view generally similar to a plan view of the upper wall member, said lower wall member being provided with projected wall members mating with said gaps formed in the upper wall member.

3. A magnetic recording tape cartridge according to claim 2 wherein said spring plate member coamprises at least one perforation in the base portion thereof, said top section comprising at least one projection whereby said perforation is engaged with said projection, which is caulked for fixing said spring plate member.

4. A magnetic recording tape cartridge according to claim 2 wherein said spring plate member has a generally V character configuration made of stainless steel material.

5. A magnetic recording tape cartridge according to claim 1 wherein said cartridge further comprises a pair of guide wall members projected from the rear wall of the top section, each of said wall members having a slanted surface the bottom of which is engaged with the corresponding edge of the base portion of the spring plate.

6. A magnetic recording tape cartridge according to claim 5 wherein said slanted surface of each of the guide wall members is further inclined so as to engage with the rear edge of the leg portion of the spring plate.

* * * * *